UNITED STATES PATENT OFFICE.

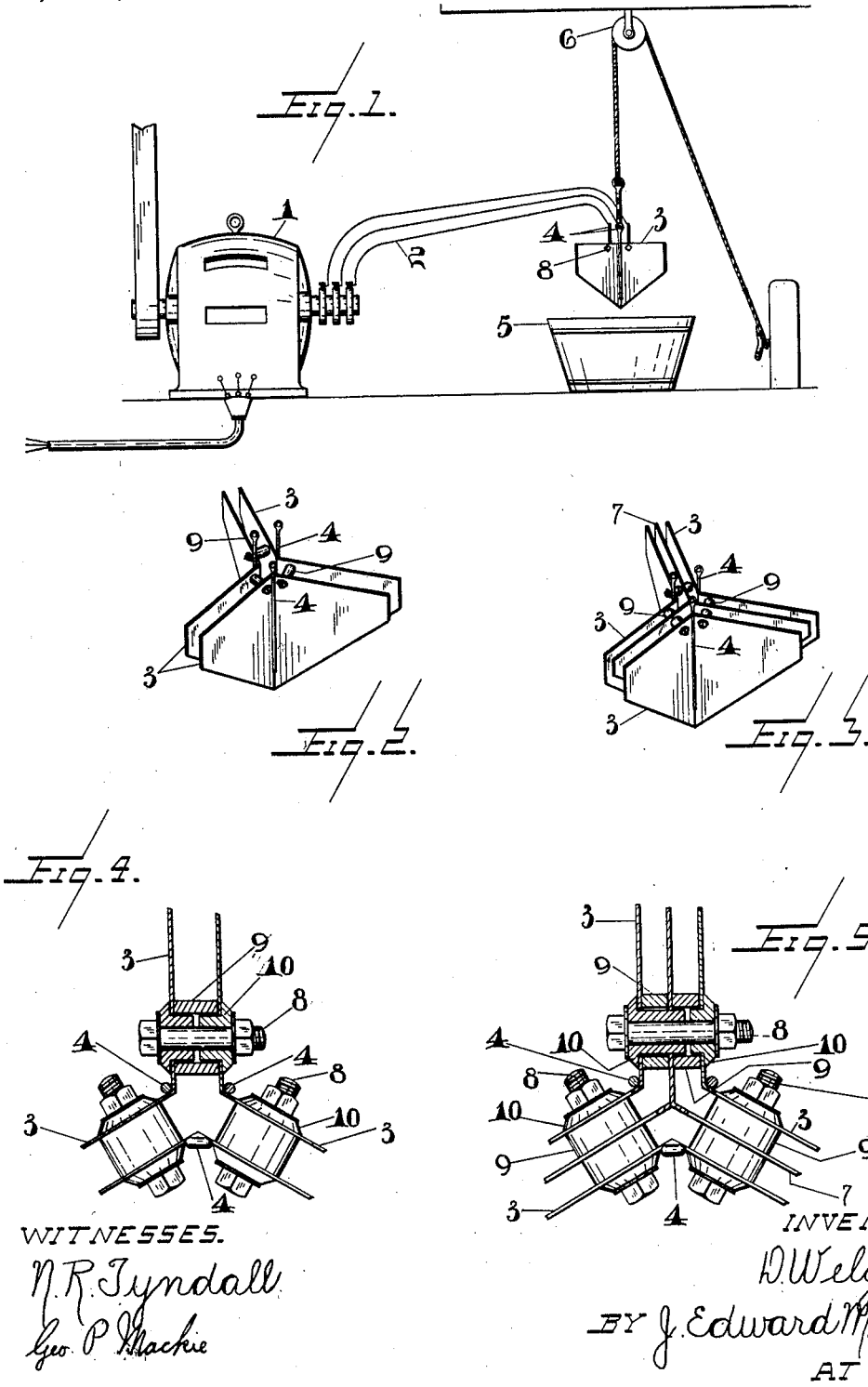
D. WELGE.
LIQUID RHEOSTAT.
APPLICATION FILED DEC. 16, 1914.
1,157,134.
Patented Oct. 19, 1915.

DIDRIK WELGE, OF SOUTH PORCUPINE, ONTARIO, CANADA.

LIQUID RHEOSTAT.

1,157,134. Specification of Letters Patent. Patented Oct. 19, 1915.

Application filed December 16, 1914. Serial No. 877,564.

*To all whom it may concern:*

Be it known that I, DIDRIK WELGE, a subject of the King of Norway, residing in the town of South Porcupine, in the District of Temiskaming, Province of Ontario, Canada, have invented certain new and useful Improvements in Liquid Rheostats, of which the following is a specification.

This invention relates to liquid rheostats especially adapted for use with three-phase induction motors. Such rheostats have usually been made either of the one tank or the three tank type. With the three tank type much difficulty is experienced in keeping the density and the level of the liquid the same in each tank. In the single tank type as usually built, the resistance between the three blades is not evenly distributed and the rotor circuit of the motor is not evenly balanced.

My object is to devise a liquid rheostat which will combine the advantages of both types of starter with the disadvantages of neither.

I attain my object by using a single tank and by so shaping the blades that paths of the same length are formed in the liquid between each of the blades and the others. This result is best attained by forming each blade in plan as an obtuse angled V, and by arranging each blade so that its halves are substantially equally spaced respectively from one half of each of the other two blades.

The efficiency of the rheostat may also be increased by placing a three-bladed neutral plate between the three live blades, the parts of the neutral plate being in electrical connection, substantially as hereinafter more specifically described and illustrated in the accompanying drawings in which—

Figure 1 is an elevation showing my invention in its simplest arrangement as connected with a three-phase slip-ring induction motor; Fig. 2 a perspective detail showing the live blades as arranged without a neutral plate; Fig. 3 a similar view showing a neutral plate arranged in use with the live blades; Fig. 4 a sectional view on an enlarged scale showing the method of connecting the live blades; and Fig. 5 a similar view showing the connection employed when a neutral plate is employed with the live blades.

In the drawings like numerals of reference indicate corresponding parts in the different figures.

Referring particularly to Fig. 1, 1 is a conventional representation of a slip ring rotary induction motor. 3 are the live blades of the rheostat, to which the connections are secured. Each blade is provided with a suitable terminal such as the rod 4 with which connections may be made. 5 is the tank containing the liquid.

Any of the ordinary arrangements may be used for causing the immersion of the blades in the liquid. A simple form is shown in Fig. 1, viz. a cable secured to the blades and passing over a pulley 6 suitably supported overhead and adapted to be made fast in any suitable manner.

The blades are shaped and arranged as shown more particularly in the detailed views. The blades are three in number, and each blade in plan, it will be seen, is of a V-shape, the angle between the halves being an obtuse angle of approximately 120 degrees. These blades are brought into juxtaposition so that the halves of each blade are substantially equally spaced respectively from one half of each of the two other blades. It is preferable, though not essential, that cross sections of the halves of the blades should be parallel to the cross sections of the halves of the adjacent blades. Usually the blades will also be arranged so that vertical sections of each half of each blade will be parallel to the corresponding sections of adjacent blades, though this arrangement is not essential.

The essential feature of the arrangement is that the paths through the liquid in the tank should be of equal resistance between each blade and each of the others, so that the rotor circuit of the motor with which the device is employed will be equally balanced.

The lower edges of the blades will have the tapered configuration shown in order that there shall be a very gradual increase of the submerged area of the blades, but this arrangement is, of course, old in the art and no particular claim is made to it.

The arrangement shown in Fig. 2 is very efficient, but still greater efficiency is obtained by the employment of the three bladed neutral plate 7, which is supported between the live blades, but is not electrically connected with any of them. Without the use of this neutral plate, only one half of the immersed area of the blades at any given period is active, whereas when the neutral plate is employed it forms a path whereby current can flow from one blade to a position from which it can flow to parts of the surfaces of the other blades, which without the neutral plate would be separated by too long a liquid path for the passage of current.

While any suitable means may be employed for supporting and insulating the live blades from one another and from the neutral plate, the construction shown in Figs. 4 and 5 I have found to give excellent results. In Fig. 4, 8 is a bolt, 9 a sleeve of insulating material and 10 two knobs of insulating material. The knobs are adapted to fit within the sleeve as shown, the blades 3 lying between their heads and the ends of the sleeve 9. When the bolt 8 is tightened up, the plates are suitably held in fixed relationship to one another and are completely insulated from one another. When a neutral plate is employed two sleeves 9 must be used, the neutral plate lying between the ends of the two sleeves. The knobs 10 are preferably so proportioned as to extend from end to end of the sleeves.

From the above description it will be seen that I have devised a form of blade construction for liquid rheostats which will effectively attain the objects of my invention as set out in the preamble of this specification.

What I claim as my invention is:—

1. A liquid rheostat of the single tank type provided with three live blades, each V-shaped in plan, said blades being arranged so that the halves of each blade are substantially equally spaced respectively from one half of each of the two other blades.

2. A liquid rheostat of the single tank type provided with three live blades, each V-shaped in plan, said blades being arranged so that the halves of each blade are substantially equally spaced respectively from one half of each of the two other blades; and a three-bladed neutral plate set between the live blades and having its parts equally spaced therefrom.

3. A liquid rheostat of the single tank type provided with three live blades, said blades being shaped and arranged to form in the liquid of the tank paths of equal resistance between each blade and each of the others.

4. A liquid rheostat of the single tank type provided with three live blades, said blades being shaped and arranged to form in the liquid of the tank paths of equal resistance between each blade and each of the others; and a three-bladed neutral plate set between the live blades and equally spaced therefrom.

Signed at South Porcupine this 2 day of December, 1914, in the presence of the two undersigned witnesses.

DIDRIK WELGE. [L. S.]

Witnesses:
FRANKLIN HAROLD HALL, [L. S.]
GEO. McKEOWN. [L. S.]